United States Patent [19]
Kahrs et al.

[11] 3,730,142
[45] May 1, 1973

[54] FISH SELF-FEEDER

[75] Inventors: James W. Kahrs; Paul E. Osborn, both of Osage Beach, Mo.

[73] Assignee: Mor-Fish-Ent, Inc., Osage Beach, Mo.

[22] Filed: Apr. 20, 1971

[21] Appl. No.: 135,589

[52] U.S. Cl. ................... 119/54, 119/51, 119/53.5, 119/3
[51] Int. Cl. ..................... A01k 5/02, A01k 64/00
[58] Field of Search ............... 119/3, 51, 53, 53.5, 119/54, 56, 56 A

[56] References Cited

UNITED STATES PATENTS

| 3,487,433 | 12/1969 | Fleming | 119/51 R |
|---|---|---|---|
| 2,972,334 | 2/1961 | Braden | 119/51 R |
| 1,107,394 | 8/1914 | Wood | 119/56 R |
| 2,503,886 | 4/1950 | Olson | 119/53.5 |
| 2,866,435 | 12/1958 | Blazier | 119/53 |
| 3,515,098 | 6/1970 | Thurmond | 119/51 R |
| 3,568,642 | 3/1971 | Hanby | 119/53.5 |
| 3,643,632 | 2/1972 | Poirot | 119/54 |

*Primary Examiner*—Aldrich F. Medbery
*Attorney*—Fishburn, Gold & Litman

[57] ABSTRACT

A fish self-feeder is mounted over a body of water containing fish and has a particulate feed containing hopper consisting of a tapered receptacle containing a funnel having the spout directed through an opening in the bottom of the container. A pendulum rod hangs vertically from the center of the spout by means of a suspension pin hooked into opposed openings in the spout. A feeder plate is adjustably positioned vertically on the rod forming a spaced obstruction for feed particles falling through the spout. The lower end of the pendulum terminates in a submerged bumper head which, when disturbed by the fish, causes a relative motion between the feeder plate and funnel spout, thereby producing a partial discharge of feed into the water.

8 Claims, 3 Drawing Figures

Patented May 1, 1973

3,730,142

INVENTOR.
James K. Kahrs
& Paul E. Osborn

BY
Fishburn, Gold & Litman
ATTORNEYS

FISH SELF-FEEDER

This invention relates to fish feeding devices and more particularly to such devices actuated by the fish.

Fish feeding devices including a trigger mechanism actuated by the fish are known, however, such known devices have one or more drawbacks such as undue complexity, excessively expensive to build and maintain, very sensitive to type and size of feed used, easily broken or disrupted in service and/or difficult to adjust for feeding rate.

This invention overcomes the above difficulties and has for its object to provide a fish self-feeder which is simple and inexpensive in construction, easily installed and maintained in operation even under adverse conditions, reliable, easily adjusted for feeding rate and particularly well suited for its intended purpose.

Other objects and advantages of this invention will become apparent from the following description taken in connection with the accompanying drawings wherein are set forth by way of illustration and example certain embodiments of this invention.

Figure 1:
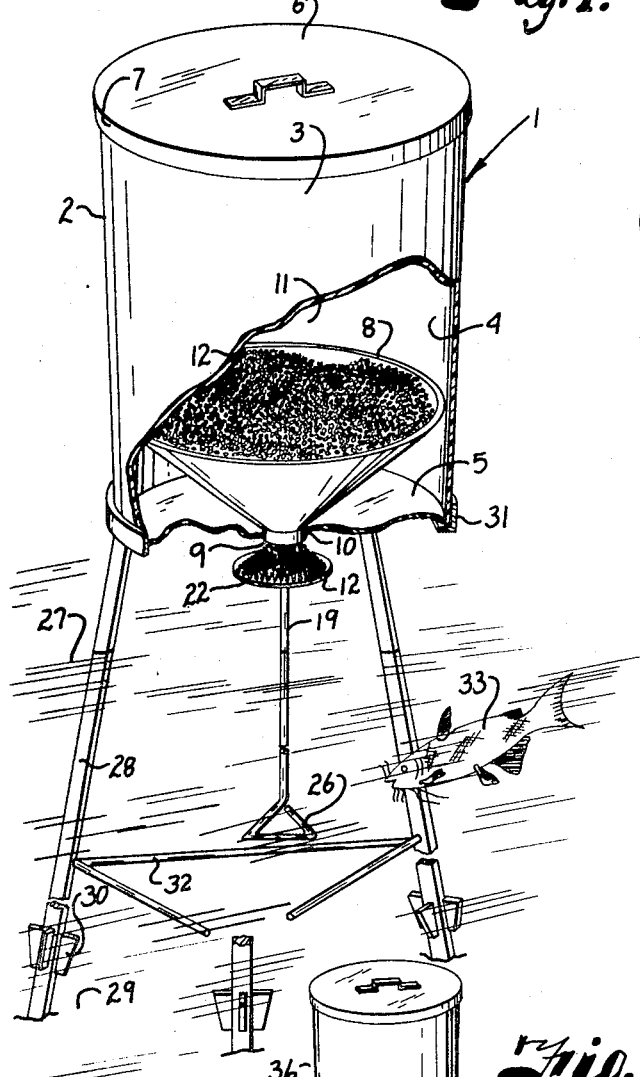
FIG. 1 is a perspective view of a fish self-feeder embodying this invention with portions broken away to illustrate interior construction.

Referring to the drawings in more detail:

The reference numeral 1 generally indicates a fish self-feeder embodying this invention. The self-feeder 1 comprises a generally cylindrical, open top container 2 preferably of an inexpensive rigid plastic type such as a common 32 gallon trash can. The container 2 includes a side wall 3 having an inner surface 4 tapering inwardly in diameter as the bottom 5 is approached. A suitable removable lid 6 having an overlapping rim 7 covers the container top and protects contents from exposure to the elements.

A funnel 7, preferably also of rigid plastic material, has a peripheral edge 8 with a diameter equal to the diameter of the inner surface 4 at a point somewhat near the container bottom 5. The bottom 5 has a central opening 9 cut therethrough and the spout 10 of the funnel 7 extends through the opening 9 when the peripheral edge 8 is jammed against the surface, FIG. 1. Thus, the interior space 11 in the container 2 above the funnel becomes an extension of the funnel or hopper space where a large quantity of feed 12 may be stored for use.

The feed 12 is preferably of the pelletted type formed in the shape of small cylinders having diameters of approximately one-eighth to three-sixteenths inch and a longitudinal dimension of approximately one-fourth to one-half inch.

Figure 2:
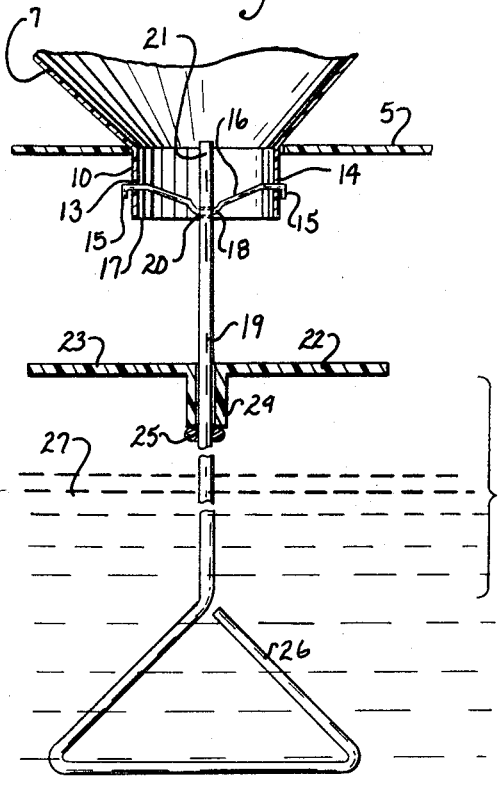
FIG. 2 is a fragmentary side elevation of the self-feeder, on an enlarged scale, particularly showing a triggering mechanism.

Opposed openings 13 and 14 are formed in the wall forming the funnel spout 10 and respectively receive opposite ends 15 of a suspension pin 16 which extends across the mouth 17 of the spout, FIG. 2. The pin opposite ends 15 are bent downwardly externally of the spout 10, thus loosely retaining the pin 16 in place but permitting free pivoting movement thereof. The portion of the pin 16 between the openings 13 and 14 is angled downwardly from the openings and near the central portion forms a downwardly directed partial loop 18, FIG. 2.

A vertical pendulum rod 19 has a transverse opening 20 extending therethrough near the upper end 21 thereof and receives the suspension pin 16 therethrough, the rod resting on the loop 18. A feeder plate 22 is comprised of a flat disc 23 having a horizontal upper surface with a diameter larger than said spout and a centrally positioned collar 24 slideably receiving the pendulum rod 19 therethrough. A suitable retainer 25, in this example taking the form of a resilient washer, firmly engages the pendulum rod 19 but under force may be vertically adjusted therealong. The retainer 25 is positioned beneath the collar 24 and thereby provides an adjustable stop for supporting the feeder plate 22 in a desired vertical position along the intermediate portion of pendulum rod 19.

The pendulum rod 19 terminates at the lower end thereof in a bumper head 26 which, in this example, takes the form of a triangle fashioned by bending the pendulum rod into three sections, FIG. 2.

The container 2 and associated structure described above is supported over a body of water 27, in this example by means of stilts or legs 28 having the lower ends thereof embedded in the bottom 29 beneath the water. Retaining fins 30 may be provided on the legs 28 to stabilize the structure in the event that the bottom is of soft silt or mud. The container 2, in this example, is supported on the legs 28 by means of a receiving ring 31 secured to the legs 28 and, if indicated, to the container 2 by any suitable fastening means (not shown). Braces 32 may be provided for increasing the rigidity or stability of the container supporting structure.

In operation, the lid 6 is lifted and a quantity of the pelletted feed 12 is inserted into the interior space 11. The feed runs downwardly through the spout 10 and in its rest position builds up upon the plate 23 until the mouth 17 of the spout is blocked. The fish 33, when hungry, butt or nudge against the bumper head 26 thereby slightly swinging the pendulum rod 19 about or with the suspension pin 16. This distributes the pellet feed blocking the spout 10, thereby permitting a small quantity of additional feed to fall through the spout and spill over the edge of the disc 23 into the water 27. Vertically adjusting the feeder plate 22 on the pendulum rod 19 alters the rate at which the feed is dispensed for a given swinging or displacement of the pendulum rod 19. The portions of the rod 19 extending above and directly below the opening 20 serve to help agitate the feed in and near the spout 10, thus aiding in preventing bridging and enhancing reliable flow upon demand.

Many species of fish easily learn the relationship between movement of the bumper head 26 and the dispensing of food, however, the depth of the bumper head 26 in the water and type and size of feed pellets may have to be varied according to the species of fish involved. Also, the overall length of the depending portion of the rod 19 and the length of the rod portion above the pin 16 may be varied to further alter sensitivity as desired. For this purpose several alternate pin openings (not shown) along the rod 19 may be provided in addition to the opening 20.

Figure 3:
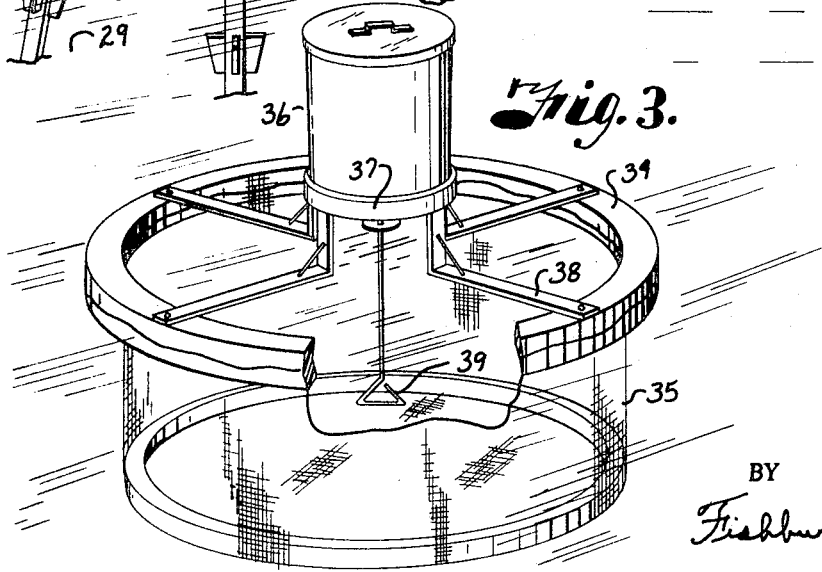
FIG. 3 is a perspective view showing the self-feeder used in connection with a floating cage feeder.

FIG. 3 shows an example of a fish self-feeder embodying this invention associated with apparatus known as a floating cage feeder wherein certain species or age of fish are isolated within a main body of water containing other fish. The floating cage feeder normally comprises a buoyant ring 34 supporting a suspended wire cage 35 or the like through which the water may pass easily but within which the fish are retained. In this example the feed container 36, corresponding to the container 2 described above, is retained by a ring 37 supported by suitable structure 38 mounted to the buoyant ring 34. The bumper head 39, corresponding to the bumper head 26, is then immersed within the water in the cage 35, and operates as described above.

It is to be understood that, although certain forms of this invention have been illustrated and described, it is not to be limited thereto except insofar as such limitations are included in the following claims.

What I claim and desire to secure by Letters Patent is:

1. An animal feeding device comprising:
  a. a receptacle for receiving and storing feed therein, means forming a funnel associated with said receptacle and having a generally cylindrical vertical wall defining a downwardly open spout;
  b. a suspension pin having opposite ends thereof engaging said spout wall and supporting said pin projecting across said spout;
  c. a pendulum rod having an upper portion, an intermediate portion and a lower portion, said suspension pin en-gaging said rod at said upper portion and suspending said rod downwardly of said spout;
  d. a feeder plate having an upper surface and vertically adjustable along said rod intermediate portion, said feeder plate upper surface being generally flat and having a diameter larger than the diameter of said spout constituting a feed support means in its rest position, and
  e. means for supporting said receptacle at an elevation whereby said rod lower portion is convenient for striking by an animal to be fed.

2. The device as set forth in claim 1 wherein:
  a. said receptacle comprises an upright generally cylindrical container having an inside surface tapering inwardly in a downwardly direction, and
  b. said means forming a funnel is a funnel member having a peripheral edge engaging said tapered inside surface.

3. The device as set forth in claim 1 wherein:
  a. said receptacle comprises an upright generally cylindrical container having a bottom wall, and
  b. said means forming a funnel is a funnel member with said spout projecting through said bottom wall.

4. The device as set forth in claim 1 wherein:
  a. said spout wall has opposed openings therein, and
  b. said pin opposite ends project through said spout wall openings.

5. The device as set forth in claim 1 wherein:
  a. said rod lower portion is bent into a non-linear shape.

6. The device as set forth in claim 1 wherein:
  a. said receptacle is constructed of plastic.

7. The device as set forth in claim 1 wherein:
  a. a portion of said rod upper portion extends substantially above said supporting pin.

8. An animal operated feeder comprising:
  a. an upright generally cylinderical receptacle having an upwardly open top, a bottom wall and a side wall, said side wall having an interior surface tapering inwardly as it approaches said bottom wall, a removable lid for covering said receptacle top,
  b. a funnel received within said receptacle and having a peripheral edge engaging said side wall interior surface, a central opening in said receptacle bottom wall, said funnel having a downwardly open spout extending through said bottom wall opening,
  c. opposed openings in said spout, a suspension pin having opposite ends thereof extending through said spout openings and supporting said pin projecting across said spout, said suspension pin depending medially of said spout,
  d. a pendulum rod having an upper portion with a transverse opening therethrough, an intermediate portion and a lower portion, said suspension pin extending through said rod opening and suspending said rod centrally from said funnel spout,
  e. a feeder plate having a generally flat horizontal upper surface and vertically slideable on said rod intermediate portion, means for adjustably retaining said feeder plate on said rod intermediate portion spaced beneath said spout, said feeder plate having a diameter larger than the diameter of said spout, and constituting a feed support means in its rest position, and
  f. means for supporting said container above a body of water at an elevation whereby said rod lower portion is submerged but said feeder plate is spaced above the water.

* * * * *